Figure 1:
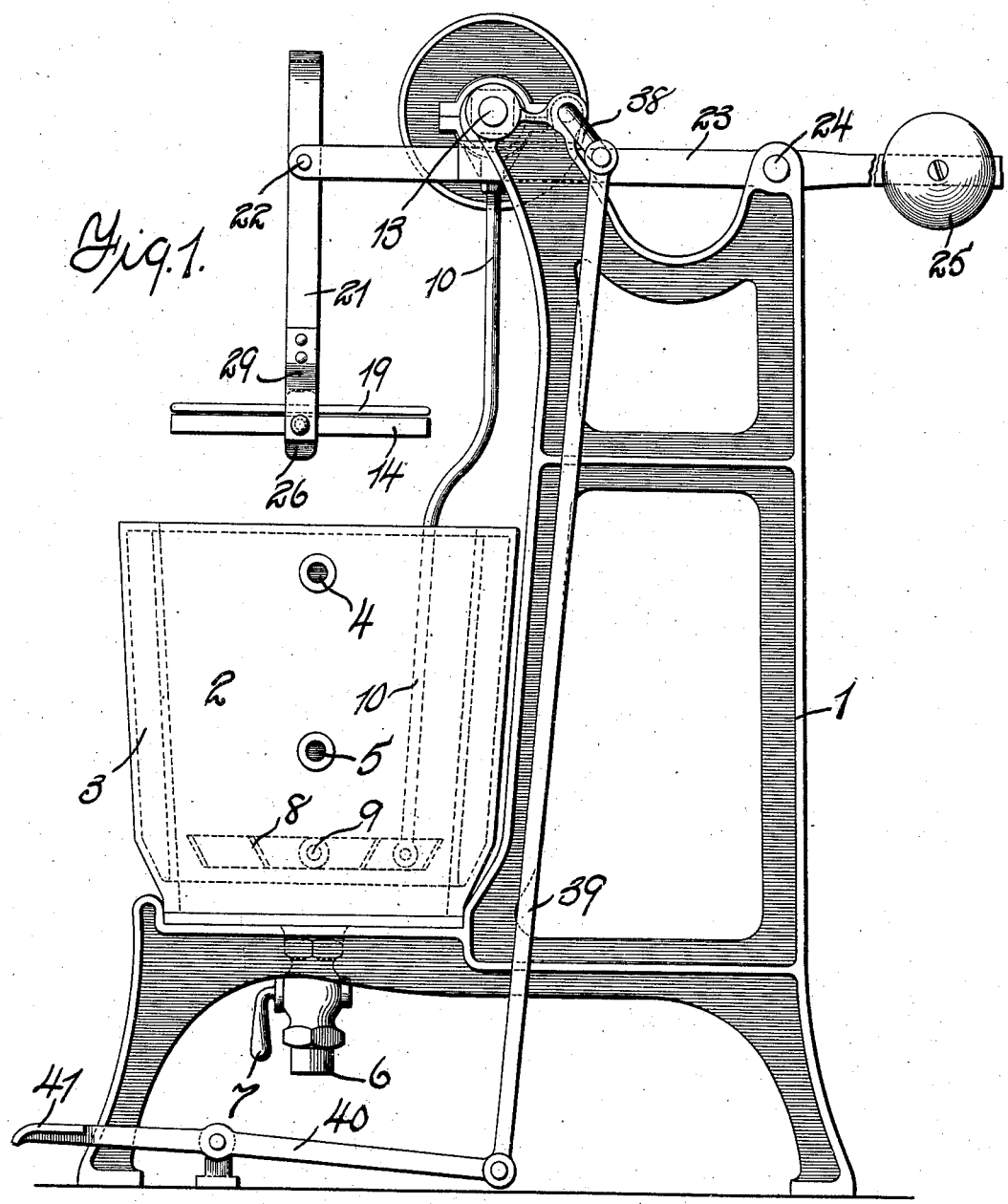

No. 851,236. PATENTED APR. 23, 1907.
L. N. HARTOG.
MACHINE FOR IMMERSING CORES OR CENTERS OF CONFECTIONS.
APPLICATION FILED FEB. 20, 1907.

4 SHEETS—SHEET 1.

WITNESSES:
M. A. Barrett.
H G Johnson

INVENTOR.
Louis N. Hartog
BY
his ATTORNEY.

THE NORRIS PETERS CO., WASHINGTON, D. C.

No. 851,236. PATENTED APR. 23, 1907.
L. N. HARTOG.
MACHINE FOR IMMERSING CORES OR CENTERS OF CONFECTIONS.
APPLICATION FILED FEB. 20, 1907.

4 SHEETS—SHEET 3.

WITNESSES:
M. A. Barrett.
H. Johnson

INVENTOR.
Louis N. Hartog
BY Herbert Knight
his ATTORNEY.

No. 851,236. PATENTED APR. 23, 1907.
L. N. HARTOG.
MACHINE FOR IMMERSING CORES OR CENTERS OF CONFECTIONS.
APPLICATION FILED FEB. 20, 1907.
4 SHEETS—SHEET 4.
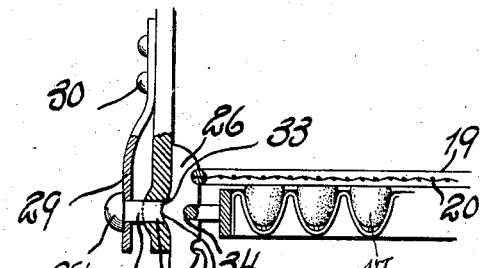
Fig. 4.
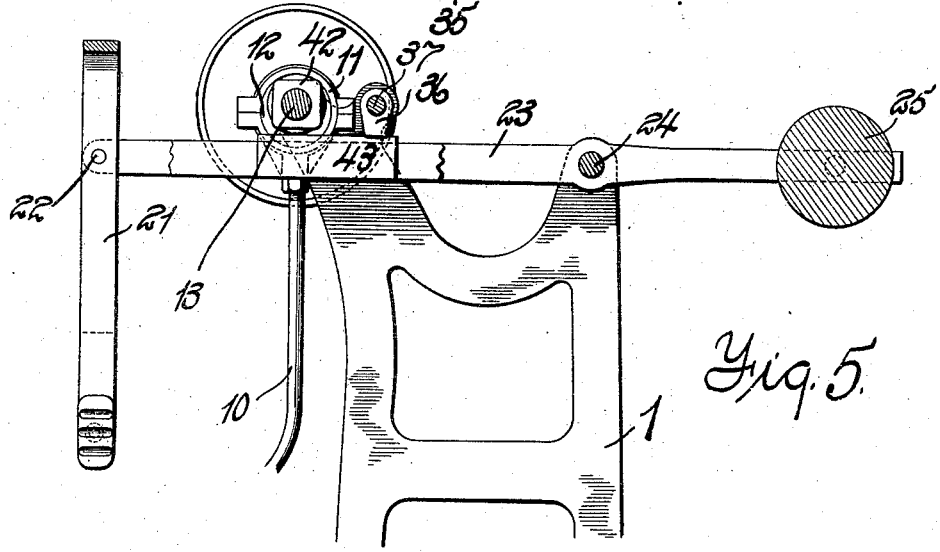
Fig. 5.
Fig. 6. Fig. 7.
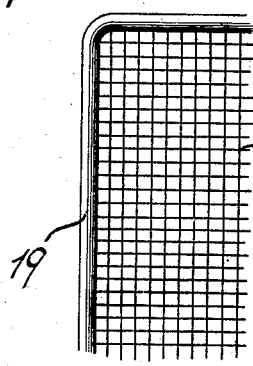
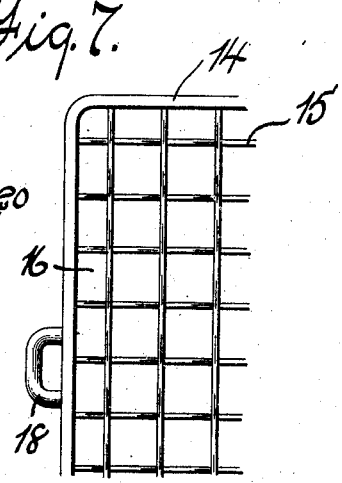
WITNESSES:
M. A. Barrett
H. Johnson
INVENTOR.
Louis N. Hartog
BY Herbert Knight
his ATTORNEY.
THE NORRIS PETERS CO., WASHINGTON, D. C.

UNITED STATES PATENT OFFICE.

LOUIS N. HARTOG, OF NEW YORK, N. Y.

MACHINE FOR IMMERSING CORES OR CENTERS OF CONFECTIONS.

No. 851,236.  Specification of Letters Patent.  Patented April 23, 1907.

Application filed February 20, 1907. Serial No. 358,374.

*To all whom it may concern:*

Be it known that I, LOUIS N. HARTOG, a citizen of the United States of America, residing at the borough of Manhattan, city of New York, State of New York, have invented certain new and useful Improvements in Machines for Immersing Cores or Centers of Confections, of which the following is a specification.

Heretofore in the manufacture of bonbons in so far as the step in the process of said manufacturing related to the immersing of the core, whereby the said core or center was inserted in a bath of melted sugar or sugar in solution heated to a proper temperature, and to the consistency of a plastic creamy mass, such process when successfully carried on has been done by hand and the machines which have been devised for imitating the hand process and perfecting a bonbon immersed, as aforesaid, have been entirely unsuccessful; they have been commercial failures without exception, for various reasons, but the principal reason proceeded from the fact that the properties of the said melted sugar, or sugar in solution as aforesaid and heated, was only imperfectly understood, the consequence being that all automatic arrangements devised for handling or manipulating the cores or centers and introducing thereon the cream finish, which, when complete would constitute what is known in the trade as bonbons, were failures.

In carrying my invention into effect I have had in mind, primarily, the fact that it requires a specially adjusted apparatus to bring the plastic mass to the proper texture and heat, and to maintain it in such condition, and furthermore it is extremely difficult to immerse the cores, or centers, for a sufficient period of time to permit the cream finish to adhere and to withdraw them at the proper moment and in such a manner as that the said cream finish shall be of the proper thickness; also having in mind the necessity of separating from the cores, or centers, all superfluous covering material, whereby when the cream finished cores or centers are withdrawn from the creamy mass they will be of the right size and shape and the finishing or covering material will be of the proper depth and thickness; in other words, the finished and covered cores will present properly formed and marketable bonbons. It is also highly important to withdraw the cores or centers quickly as the semi-fluid or creamy mass dries and hardens with great rapidity. All these conditions must be borne in mind in carrying a satisfactory core immersing machine, where the covering is to be of creamy sugar as aforesaid, into practical and commercial effect.

Figure 2:
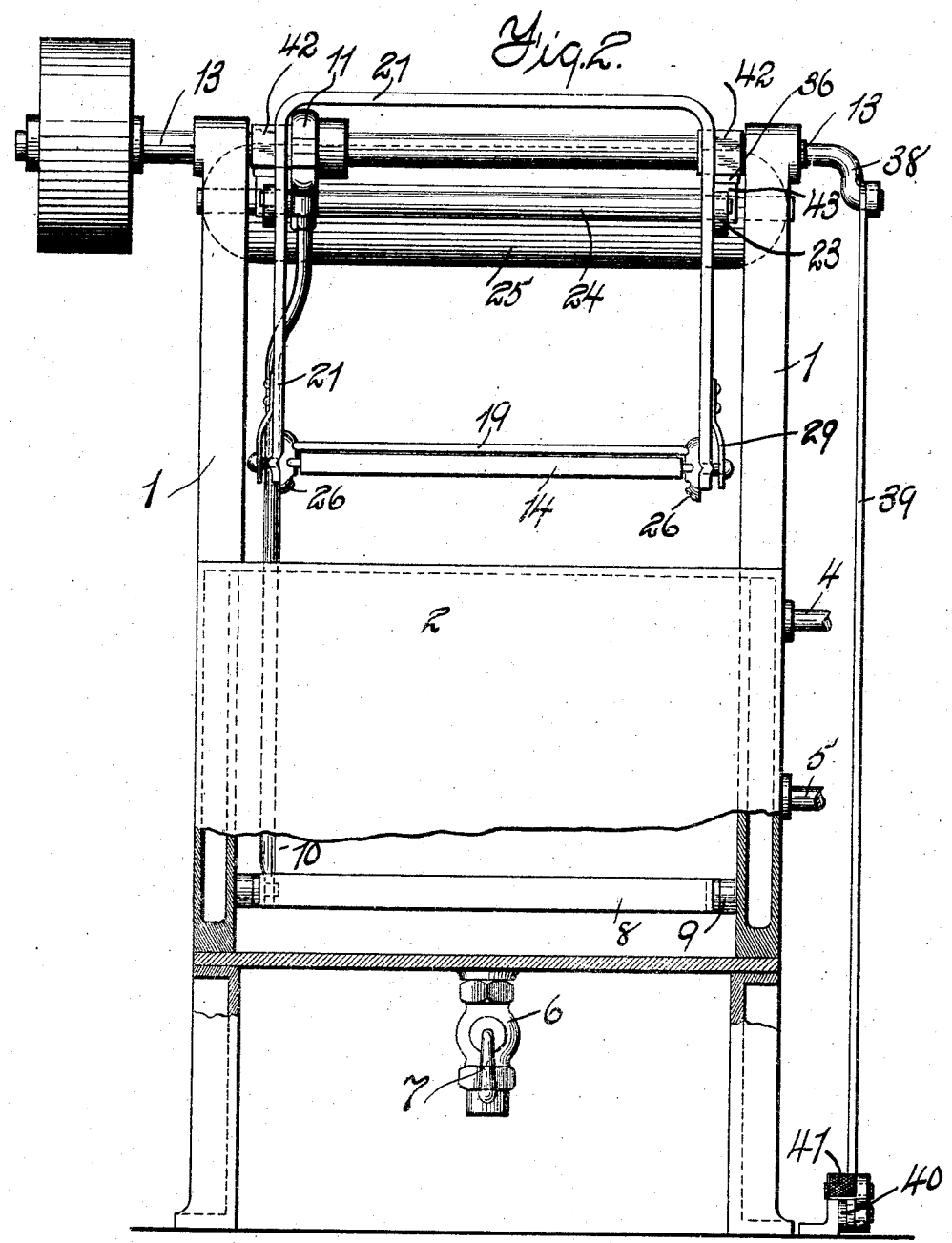
Figure 3:
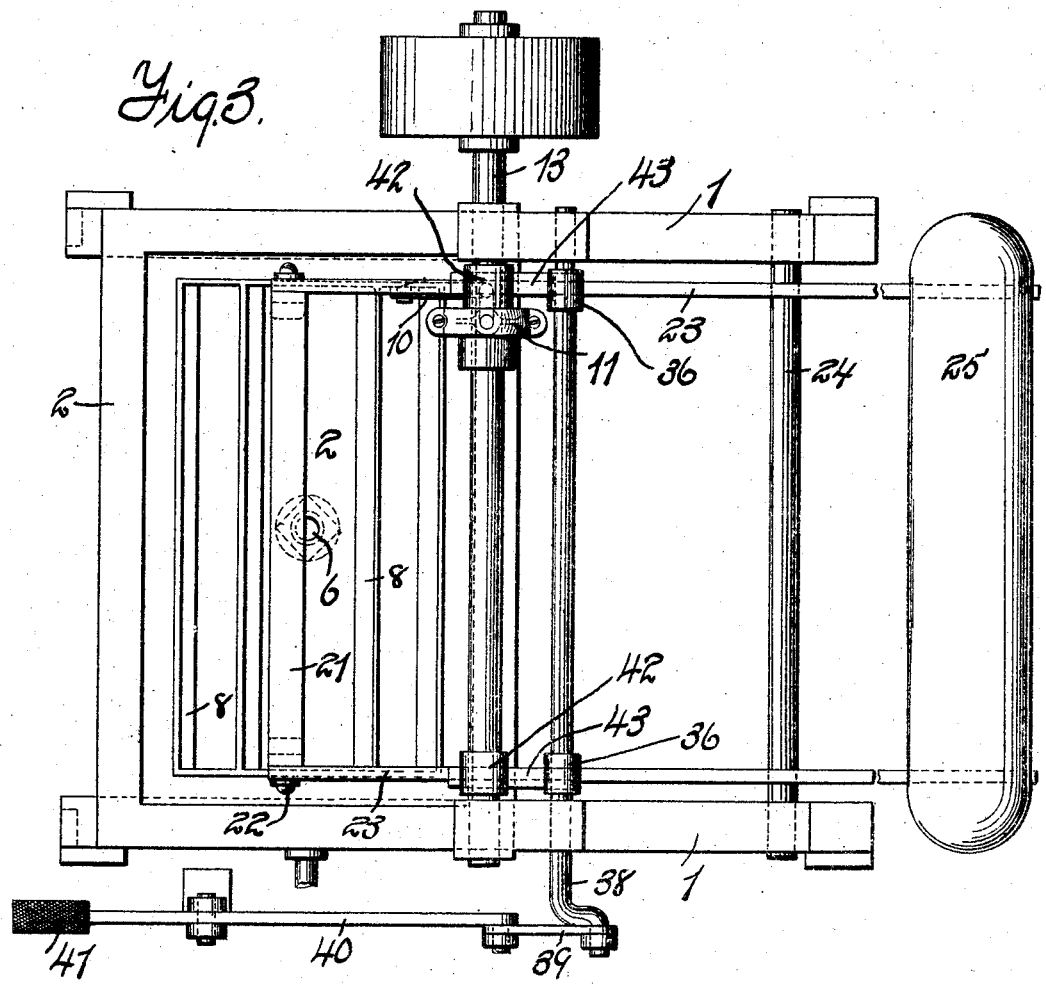

For the better understanding of my present invention, I will proceed to describe the same in detail in connection with the accompanying drawings which form a part of this specification; and in which, Figure 1 represents a side elevation of my improved machine; Fig. 2 represents a front elevation of the same; Fig. 3 is a plan view of my machine; Fig. 4 is a detail, sectional view of the tray or basket for holding the cores; Fig. 5 is a detail, sectional view on the line 4—4 of Fig. 3; and Fig. 6 is a detail, plan view of the cover, and Fig. 7 is a similar view of the tray or basket.

In these drawings, 1 represents a frame or supporting structure of suitable height and dimensions, and 2 a tub or receptacle supported and held in position by the aforesaid frame. The tub 2 is designed to act as a receptacle for the immersing material, and it is adapted to, and arranged for, holding the said material in a semi-liquid, plastic or creamy mass; and as a means of keeping said material at the proper temperature and consistency, I provide a chamber 3 between the walls of the said tub or receptacle into which I introduce steam or hot water by means of the pipe 4, the said pipe drawing its supply of steam or hot water from any suitable source. Similarly, for reducing the temperature of the contents of the tub or receptacle 2, I provide a pipe 5, which also opens into the chamber 3. By introducing cold water through this pipe 5 the temperature of the plastic mass in the tub 2 can be reduced to the proper point. At 6 I show means for draining the tub or receptacle and a turn cock 7.

At 8 I show a stirrer, which consists of a rectangular frame, shown in dotted lines in Fig. 1 and in side elevation in Fig. 2. This frame is pivoted at the points 9 and is provided with a rod 10 which extends upwardly and is provided with a collar 11 surrounding a cam 12; the cam 12 is mounted upon the shaft 13. As the said shaft 13 rotates it imparts a movement to the cam 12 which, in turn, as it rises and falls, draws the rod 10 up and down and produces a rocking movement in the stirrer 8.

The object of this part of my invention is to keep the contents of the tub or receptacle 2 in constant motion and this action, together with the heat, preserves the contained mass at its proper consistency and temperature; the stirrer, in other words, assists in preventing the contents of the tub or receptacle 2 from becoming hardened and forming a solid mass at the bottom; or turning back into sugar.

At 14 I show a tray or basket preferably rectangular in shape and of a size suitable for immersion in the tub 2 and having a net 15 of wires, said wires crossing each other at right angles and forming pockets 16. These pockets are shown in vertical cross section in Fig. 4 and in plan view in Fig. 6. The cores or centers seating in the said pockets are shown at 17. I provide handles 18 for the convenience of manipulating the said tray or basket. I also provide a cover consisting of a rim 19 and wire mesh work 20. This cover is, in operation, arranged above the tray or basket in suitable proximity thereto and parallel therewith, but it is in no wise attached to the tray or basket and has independent means of connection with the supporting parts, as will be explained. It serves, however, to imprison the cores or centers 17 in the pockets 16 of the tray or basket and this is illustrated in Fig. 4 of the drawings. In the act of immersing these cores or centers the position of the parts are as shown in Fig. 4, and the tray or basket is arranged to descend in an approximately vertical path and to a point beneath the surface of the plastic mass.

At 21 I show a yoke, consisting of an upper central horizontal piece and two downwardly extending arms. The lower end of the arms are free and are adapted to give slightly in a sidewise direction when the tray or basket is brought into position to be held and retained by the said arms. The yoke is mounted at the points 22 upon the rear of the extending arms 23, the latter being mounted in the main frame at 24. The arms 23 have a turning movement on the points 24, and the yoke has a turning movement on the points 22. The rear ends of the arms 23 are provided with a counter-balancing weight 25, which may be arranged adjustably thereon.

At 26 I show cheeks or plates mounted upon the arms 21 at their lower ends and having outwardly extending studs 27, with heads 28, and impinging against the said heads 28 are spring plates 29 secured to the arms 21 at 30; the studs or pins 27 extend through openings 31 in the lower end of the arms 21 and the cheeks or plates 26 have shoulders 32 which are adapted to lock into corresponding insets 33 of the arms 21. It will be seen that when the cheeks or plates 26 are in the position shown in Fig. 4, the spring plates 29 will press against the heads 28 of the stud 27 and will draw the plate 26 into said position, the shoulder 32 being seated in the inset 33; and by this means the said cheek or plate 26 will be held to this position. The construction, however, permits of the dislodgment of the plate or cheek 26 by quick and forcible movement and this is accomplished as follows:

The handles 18 of the tray or basket 14 seat and lock in sockets 34 and are pressed into such position by reason of the spring or resiliency of the arms 21. They are, when placed in position, thrust down over the curved portion of the cheeks or plates 26 and reach the central position, the handles 18 being permitted to enter the sockets 34. Sockets 35 also are provided for holding the cover 19 in position. The plates or cheeks 26 are provided with two sets of these sockets 35 which permit of the reversal of the said cheeks or plates and the retention at all times of the means for receiving the cover upon the upper side of the tray or basket.

The operation of this part of my machine is as follows: When the tray or basket 14 is filled with the cores or centers 17, it is taken from the place of filling and inserted into the cheeks 26 of the arms 21, as shown in Fig. 4, and this is accomplished by pressing the tray or basket down slightly so as to expand the lower ends of the arms 21 laterally and thrust the handles 18 into the sockets 34. When the tray or basket containing the cores or centers has reached this position, the cover 19 is placed over it and the ends or edges of the cover locked into the socket 35. The cores are now ready for immersion and by pressing down on the yoke, the tray or basket with the cores or centers locked therein, is immersed in the tub 2.

It is important in carrying my invention into effect to provide means for placing and retaining the cover at just the right distance from the tray or basket, and it is also important to arrange the cover and tray or basket exactly parallel one with the other and to provide the proper mesh in the wire work 20 of the said cover; for, as the tray or basket, with the cover, are thrust into the immersing bath or plastic mass, the coating material will flow around the cores or centers and through the mesh of the tray or basket and will force, or tend to force, the cores or centers up against the cover; at the same time, owing to the consistency of the coating material it will flow up and around the said cores or centers and above the same and will occupy the space between the cores or centers and the cover above the same. In other words, there will be a flow of the plastic mass around and above the cores or centers and between the same and the cover, so that while the cover is provided to check the escape of any core or center which would naturally be pushed from its proper pocket by the impact of the immersing bath during the descent of the tray or basket, there is means provided by the space aforesaid for the coating material to flow around the core or center after it has naturally returned to its proper pocket after being ejected in the movement of the tray or basket in the immersing bath. In carrying my invention into effect these are important and necessary factors, for it is an incontrovertible fact, demonstrated many times over, that machines and apparatuses which are adapted for the coating of candies in a chocolate bath are utterly unfit and unadapted to coat cores or centers in a creamy sugar bath. The flow of these two coating bodies is entirely different and the hardening tendency varies immensely, and it is therefore necessary to adapt the immersing mechanism in a machine for coating cores or centers with a creamy covering to have in mind the sluggishness of the flow of said coating mass and the rapidity with which it hardens the moment it is removed from the direct heating apparatus.

My invention, as I have devised it, is especially suitable for immersing cores or centers in a thick creamy sugar bath and securing a suitable coating and producing what is known in the trade as bonbons, an article which has hitherto been made exclusively, for the foregoing reasons more particularly, by hand.

I will now proceed to describe the means for shaking off and removing the superfluous covering mass from the cores or centers when they are removed from the bath. After the immersing process, the tray or basket and its cover are brought to the position shown in Fig. 1, but as it is withdrawn from the plastic mass the cores or centers contain much more of the finishing mixture than is desirable for a commercially complete and satisfactory article. To remove this superfluous covering I agitate the tray or basket and for this purpose I provide swinging fingers 36 mounted upon a shaft 37, the latter being connected by a link 38 to a rod 39 and pedal 40. When the pedal 40 is operated by depressing its outer end 41, the rod 39 is thrown up and the fingers 36 are withdrawn from their locking position; that is to say, in the position shown in Fig. 5 where they bear upon the arms 23 and hold the forward ends of said levers down against the counter-acting weight 25. When the fingers 36 are withdrawn, however, the weight will depress the inner ends of the arms 23 and will throw the outer ends up against a rotating nut 42, the latter being mounted upon the main shaft 13. As the nut 42 rotates the corners of the same come in contact with the anvil plate 43, mounted upon the arms 23, and will cause a succession of quick and violent blows upon said plate and consequently upon the arms 23 and upon the yoke 21 and the tray or basket suspended therein. This action will cause the creamy substance upon the outer part of the cores or centers of the candies to be shaken off and the operation can be kept up until the finishing material is of the proper thickness. This rapid agitation of the tray or basket serves also to separate such portions of the covering material as happen to be sticking to the cover. When such superfluous coating material has been removed, the cover 19 is withdrawn and a piece of wax paper, or other suitable material of proper size, is substituted therefor, and upon this a supporting plate, not shown. The tray or basket is then given a half rotation bringing the base of the conical shaped candies downwardly and upon again pressing the pedal 41 another violent agitation of the tray or basket takes place and the candies are shaken from the tray or basket upon the receiving paper beneath.

It will be seen that a half reversal of the tray or basket which carries the plates or cheeks 26 with it, turning as they do on the studs 27, still leaves the parts in receiving position for the next tray or basket, and also brings the other set of sockets 35 into position for receiving the cover above the tray. It will be seen also that the tray or basket, and the cover therefor, are two entirely separate and distinct items; that the cover is not directly attached to the tray or basket and can be removed separately and by itself and that its removal will not disturb the tray or basket in any way. It will also be seen that upon the removal of the cover the tray or basket can be given a half rotation and again be shaken, and that when the said tray or basket has reached this position it can be removed and that the machine thereupon, without further manipulation, presents itself for the reception of the next tray or basket, and also for the independently removable and detachable cover. In other words, the receiving yoke for the tray or basket has means for removably securing the tray or basket and has two sets of devices, one on each side of the means for receiving the tray or basket, for receiving the cover of the same. In a machine of this nature when rapidity and accuracy of movement are essential such an arrangement is of the greatest utility.

Having now particularly described and ascertained the nature of my said invention, what I claim and desire to secure by Letters Patent is:

1. In a machine for immersing cores or centers and giving them a cream finish, the combination of a receptacle for holding the plastic mass, a tray carrying and immersing frame having means for removably retaining the tray, and means both above and below the tray securing means for removably securing the cover, with said tray and cover.

2. In a machine for immersing cores or centers and giving them a cream finish, the combination of a receptacle for holding the plastic mass, a yoke having means for supporting and operating same and provided near its lower end with cheeks or plates on the opposed faces of the yoke, means centrally located in said cheeks or plates for receiving a tray or basket, and two pairs of sockets 35 located in said cheeks, as shown, for the alternate reception of the cover, with said tray and cover.

This specification signed and witnessed this sixth day of February, 1907.

LOUIS N. HARTOG.

Signed in the presence of—
 MARGARET A. RUSH,
 ARTHUR J. CLARK,
 FRANCIS T. OWENS.